United States Patent [19]

Hayasaka

[11] Patent Number: 4,969,370

[45] Date of Patent: Nov. 13, 1990

[54] BEARING STRUCTURE FOR INTERMEDIATE TRANSMISSION SHAFT IN VESSEL PROPULSION MACHINE

[75] Inventor: Kenichi Hayasaka, Hamamatsu, Japan

[73] Assignee: Sanshin Kogyo Kabushiki Kaisha, Hamamatsu, Japan

[21] Appl. No.: 254,419

[22] Filed: Oct. 6, 1988

[30] Foreign Application Priority Data

Oct. 8, 1987 [JP] Japan .................. 62-254255

[51] Int. Cl.$^5$ .............................. F16H 1/14
[52] U.S. Cl. ........................ 74/417; 384/585
[58] Field of Search ............ 74/417, 424; 384/540, 384/571, 585, 619

[56] References Cited

U.S. PATENT DOCUMENTS

| | | | |
|---|---|---|---|
| 2,019,464 | 10/1935 | Riblet | 74/424 |
| 3,943,790 | 3/1976 | Meyer | 74/417 |
| 4,729,252 | 3/1988 | Hüber et al. | 74/417 |
| 4,824,264 | 4/1989 | Hoebel | 384/571 X |

FOREIGN PATENT DOCUMENTS 58-207545 12/1983 Japan ..................... 74/424

*Primary Examiner*—Leslie A. Braun
*Assistant Examiner*—Scott Anchell
*Attorney, Agent, or Firm*—Ernest A. Beutler

[57] ABSTRACT

A marine outboard drive particularly adapted for use in a twin stern drive arrangement which facilitates reversal of the degree of rotation of the output shaft. A bevel gear train drives a drive shaft of the outboard drive and because of the counterrevolution is supported by a pair of oppositely acting thrust bearings. An improved arrangement is provided for preloading the thrust bearings and for positioning the driven bevel gear within the drive shaft housing so as to adjust the meshing relationship between the gears.

11 Claims, 2 Drawing Sheets

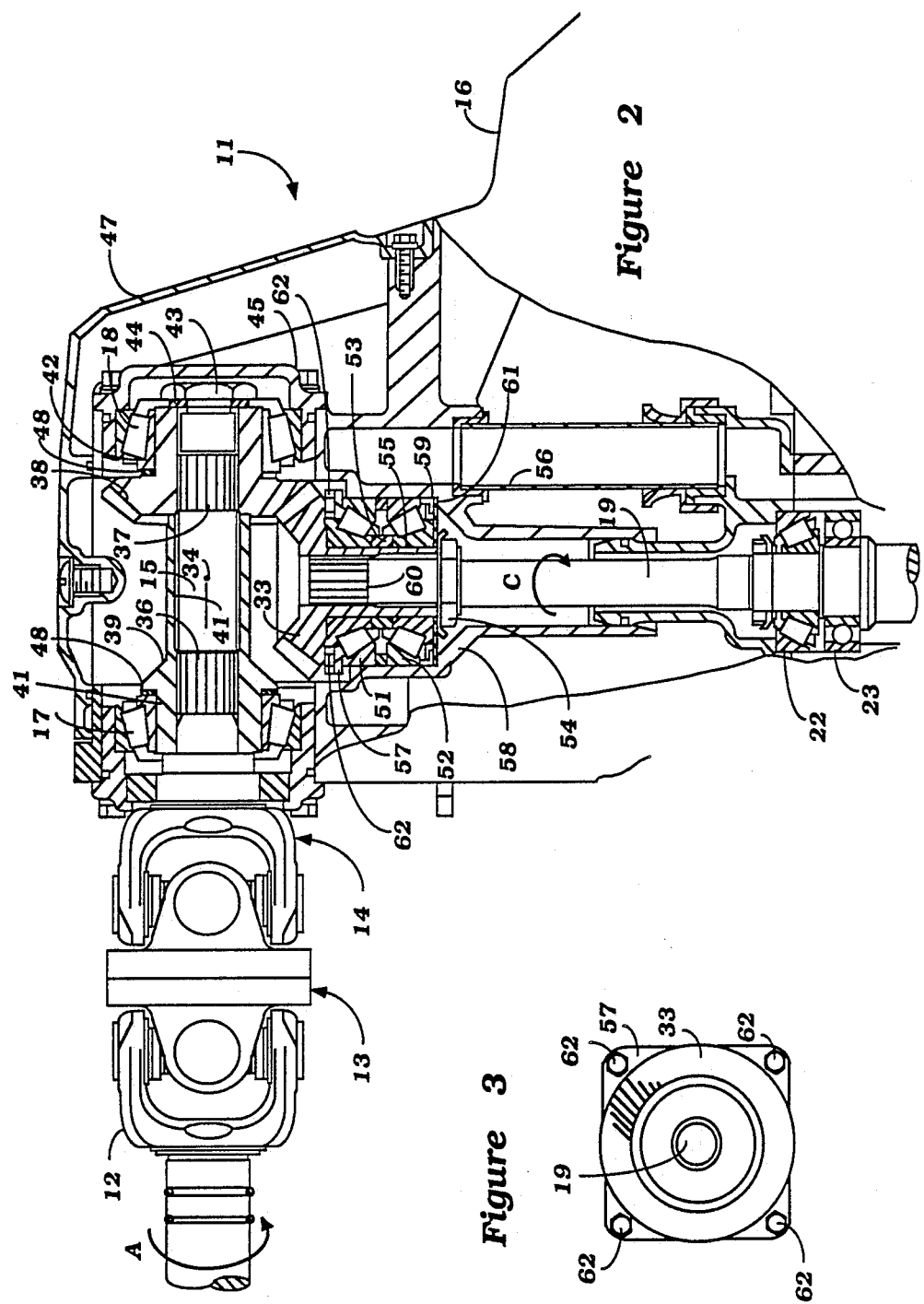

BEARING STRUCTURE FOR INTERMEDIATE TRANSMISSION SHAFT IN VESSEL PROPULSION MACHINE

BACKGROUND OF THE INVENTION

This invention relates to a bearing structure for an intermediate transmission shaft of the type used in a vessel propulsion and more particularly to an improved arrangement for preloading the thrust bearing associated with a driven bevel gear so as to facilitate adjustment of the gear mesh.

In a variety of applications, a bevel gear train is employed for driving an intermediate shaft. Normally, the intermediate shaft and bevel gear are supported by a thrust bearing arrangement since the bevel gear drive itself creates a thrust on the gear in an axial direction. With such an arrangement, it is necessary to both preload the thrust bearing and to preload the gear so as to adjust its meshing relationship with the driving gear. Obviously, such arrangements require complicated constructions.

In one form of mounting heretofore proposed, it has been the practice to assemble the driven gear and its thrust bearing in a separate assembly which is provided with its own housing. This gear assembly is then mounted in the overall transmission casing. However, the bearing preload of this type of arrangement must be adjusted when the bearing and housing are assembled to the second gear and a threaded fastener such as a nut is normally used for this purpose. However, when mounting the assemblage, the gear position must be adjusted upon assembly using shims and another fastening nut. Therefore, such constructions are quite complicated.

It is, therefore, a principal object of this invention to provide an improved driving arrangement for driving a shaft including a bevel gear and thrust bearing.

It is a further object of this invention to provide an improved structure for assembling a driven gear and supporting thrust bearing within a housing.

One typical application in which bevel gear drives of the type described are employed is in the outboard drive unit of a marine watercraft. Such outboard drive units, and particularly the outboard drive portion of an inboard-outboard drive, employ a bevel gear arrangement for driving the drive shaft from the input shaft of the outboard drive unit. The input shaft is driven by an engine that is mounted internally of the hull of the associated watercraft. Recently, there has been a demand for the use of twin outboard drives wherein two such outboard drive units are mounted on a given hull. With such an arrangement, it is desirable to insure that the propellers associated with the outboard drives rotate in opposite directions so as to achieve balancing of the driving thrust, one of the principal reasons why such twin drives are employed. The construction can be simplified if the same general overall construction is used for each unit of the twin drive. This can be accomplished by employing an arrangement for reversing the direction of rotation of the drive shaft internally of the outboard drive. However, conventional outboard drives are designed so as to take thrust of the drive shaft in only one direction.

It is, therefore, a still further object of this invention to provide an improved driving arrangement for a marine outboard drive wherein reverse thrusts may be taken on the drive shaft through an improved thrust bearing and mounting relationship.

SUMMARY OF THE INVENTION

This invention is adapted to be embodied in a drive arrangement for driving a drive shaft that is supported for rotation within a housing assembly from an input shaft that is rotatable about an axis that is offset from the axis of the drive shaft. The arrangement comprises a driven gear that has a hub portion and which is designed to be coupled for rotation with the drive shaft. A thrust bearing is affixed to the hub portion and is axially preloaded thereon by first fastening means. A mounting plate is secured relative to at least one of the driven gear and thrust bearing and second fastening means are employed for fixing the driven gear, the thrust bearing and the mounting plate as a unit to the housing assembly.

BRIEF DESCRIPTION OF THE DRAWINGS

FIG. 2 is an enlarged view showing a portion of the construction illustrated in FIG. 1 and set up for counterrotation.

FIG. 3 is an enlarged cross-sectional view taken along the line 3—3 of FIG. 2.

DETAILED DESCRIPTION OF THE PREFERRED EMBODIMENT

Figure 1:
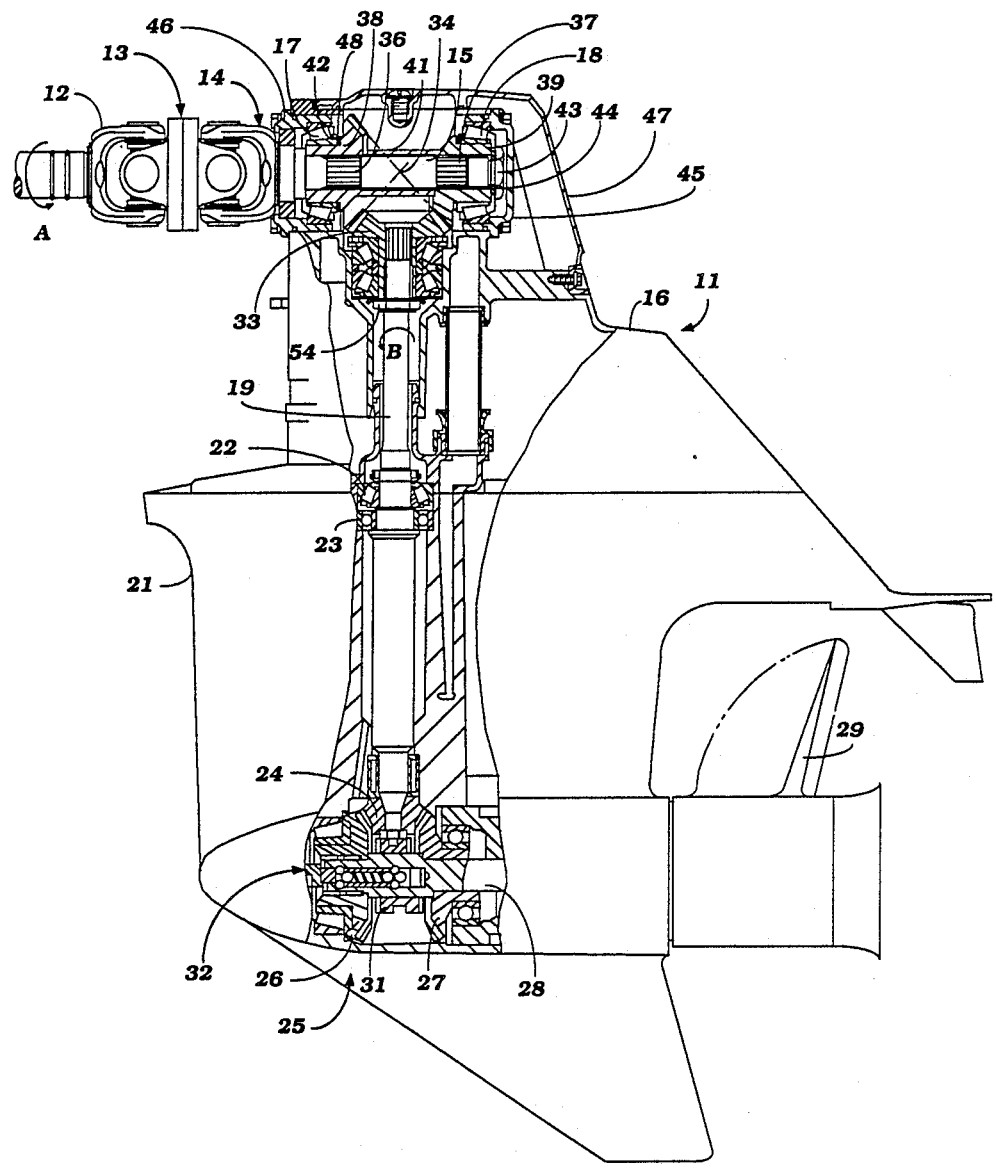
FIG. 1 is a side elevational view, with portions shown in section, of a marine outboard drive constructed in accordance with an embodiment of the invention and set up for rotation in a first direction.

A marine outboard drive constructed in accordance with an embodiment of the invention is identified generally by the reference numeral 11. In the illustrated embodiment, the outboard drive 11 is comprised of the outboard drive unit of an inboard-outboard drive. It is to be understood, however, that certain facets of the invention may be applied equally as well with outboard motors or in other applications in which power transfer is employed. The invention, however, has particular utility in connection with arrangements wherein it is desirable to have the outboard drive and specifically its propulsion unit rotate in either normal or counterrotation modes.

The outboard drive 11 is powered by a remotely positioned internal combustion engine (not shown) which drives an output shaft 12 that rotates in a constant direction, indicated generally by the arrow A and which is, in the illustrated construction, counterclockwise. The output shaft 12 is coupled by means of a universal joint 13 to an input shaft 14 of the outboard drive 11. The input shaft 14 has an extending portion 15 that is journaled within a drive shaft outer housing 16 of the outboard drive 11 by means of a pair of spaced apart thrust bearings 17 and 18, in a manner to be described.

A vertically extending drive shaft 19 is supported in the housing 16 by means of bearings to be described and depends into a lower unit 21. The drive shaft 19 is driven from the input shaft 15, in a manner to be described, so as to rotate either in a forward direction indicated by the arrow B in FIG. 1 or a reverse or counterdirection indicated by the arrow C in FIG. 2.

The drive shaft 19 is journaled by means of a first thrust bearing 22 that is positioned between the drive shaft housing 16 and lower unit housing 21 and an antifriction bearing 23 which is journaled adjacent it. The thrust bearing 22 is designed to take vertically upward thrusts transmitted to the drive shaft 19.

At its lower end, a bevel gear 24 is affixed for rotation with the drive shaft 19 in a known manner. The bevel gear 24 forms a portion of a forward, neutral, reverse transmission, indicated generally by the reference numeral 25. The forward, neutral, reverse transmission 25 includes a pair of counterrotating bevel gears comprised of a forward drive gear 26 and a reverse drive gear 27 that are in mesh with the driving bevel gear 24 on diametrically opposite sides of it. The bevel gears 26 and 27 are journaled upon a propeller shaft 28 to which a propulsion device such as a propeller 29 is affixed in a known manner.

A dog clutching sleeve 31 has a splined connection with the propeller shaft 28 so as to rotate with it and also to be axially movable along it. A shifting mechanism, shown partially at 32, is provided for shifting the dog clutching sleeve 31 between a neutral position as shown in FIG. 1 and a forward position wherein the dog clutching sleeve 31 rotatably couples the forward bevel gear 26 with the propeller shaft 28. Alternatively, the shifting mechanism 32 may shift the dog clutching sleeve 31 rearwardly so as to engage with the reverse gear 27 so as to rotatably couple this gear with the propeller shaft 28 for driving the propeller 29 in a reverse direction. This mechanism is generally conventional and, for that reason, further description of it is not believed to be necessary to understand the construction and operation of the inventive features of this embodiment.

It will be noted that a bevel gear 33 is affixed to the upper end of the drive shaft 19 in a manner to be described. The bevel gear 33 has its pitch circle arranged so that it intersects a point 34 at which the input shaft 15 is intersected by the axis of rotation of the drive shaft 19. The upper end of the drive shaft 19 and specifically the driven bevel gear 33 is supported in a manner also to be described by means of a double taper bearing 35 so as to take driving thrusts on the bevel gear 33 in opposite directions. This is in contradistinction to conventional constructions wherein a single acting thrust bearing is normally employed in this area. However, in accordance with the embodiment of the invention, the drive shaft 19 is adapted to be rotated in either the forward B or reverse C directions by the mechanism not to be described. As a result, the thrust bearing 35 is designed to take thrusts in either direction.

It will be noted that the input shaft portion 15 is provided with spaced splined sections 36 and 37 that are spaced equidistant from the point of intersection 34 of the input shaft 14 and the drive shaft 19. A driving bevel gear 38 is designed to be selectively engaged with either the splined section 36 (FIG. 1) for forward rotation in the direction of the arrow B or with the splined section 37 (FIG. 2) for counterrotation in the direction of the arrow C. A spacer sleeve 39 cooperates with the bevel gear 38 so as to insure proper alignment in each condition. It should be noted that the spacer sleeve 39 is formed with a hub portion 41 which is complementary in configuration to a hub portion 42 of the bevel gear 38 so as to facilitate this reversing in the direction of rotation.

In the forward degree of rotation as shown in FIG. 1, the hub 42 of the driving bevel gear 38 is journaled in the thrust bearing 17 and the hub 41 of the spacer shaft 39 is journaled in the thrust bearing 18. The assemblage is held together by means of a lock nut 43 and lock washer 44 that are received on a threaded end of the input shaft 14. A bearing cap 45 serves to hold and locate the thrust bearing 18. At the opposite end, a bearing cap 46 holds and locates the thrust bearing 17. A removable cover plate 47 affords access to the nut 43 so as to facilitate reversal of the bevel gear 38 and spacer sleeve 39 on the input shaft section 16 for reversal of the direction of rotation. Shims 48 are interposed between the thrust bearings 17 and 18 and the gear 38 and spacer sleeve 39 so as to provide axial alignment between the bevel gears 38 and 33.

Referring now primarily in detail to FIGS. 2 and 3, the thrust bearing arrangement for the bevel gear 33 and upper end of the drive shaft 19 and its manner of assembly will now be described. The thrust bearing assembly 35 includes a first thrust bearing 51 which is disposed so as to take vertically downward thrusts acting on the bevel gear 33. The inner race of the first thrust bearing 51 is engaged with the backside of the bevel bear 33 and thus is axially loaded thereagainst. A second thrust bearing 52 is disposed beneath the thrust bearing 51 and acts to take vertically upward thrusts on the gear 33. The inner race of the bearing 52 is engaged with a spacer ring 53 which; in turn; engages the inner race of the bearing 51. A lock nut 54 is threaded onto a threaded portion of a hub 55 of the bevel gear 33 which passes through the inner races of the bearings 51 and 52. A lock washer 56 holds the lock nut 54 in its adjusted position. By tightening of the lock nut 54 on the bevel gear hub 55, the preload of the thrust bearings 51 and 52 can be adjusted. It should be noted that this adjustment is made before the assembly comprised of the bevel gear 33 and thrust bearing 35 is supported in the drive shaft housing 16.

The bevel gear 33 has a splined hub that mates with an externally splined portion 60 of the drive shaft 19 so as to rotatably couple these shafts together. A mounting plate 57 is put in position between the outer race of the thrust bearing 51 and the backside of the bevel gear 33 so as to fix the mounting plate 57 axially relative to this assemblage when the nut 54 and lock washer 56 are put in place. As a result, the mounting plate 57 forms a portion of the assemblage which is mounted into the drive shaft housing 16.

It should be noted that the drive shaft housing 16 has a generally upwardly opening flange portion 58 into which the assemblage is placed. A spacer plate 59 and shims 61 are positioned between the outer race of the lower thrust bearing 52 and a shoulder formed at the base of the housing portion 58 so as to provide adjustment of the meshing relationship between the bevel gears 33 and 38. Bolts or other threaded fasteners 62 are then passed through openings in the mounting plate 57 and threaded into tapped openings in the drive shaft housing portion 58 so as to fix the assemblage in position. After this has been assembled, the input shaft 14 and upper portion of the drive may be assembled in a manner which is believed to be obvious from the foregoing description.

It should be readily apparent from the foregoing description that a very simple and high effective drive arrangement has been provided for permitting a bevel gear and its supporting thrust bearing to be assembled into a housing assembly. The arrangement also permits reversal of the direction of drive because of the use of a double tapered thrust bearing.

The foregoing description is that of a preferred embodiment of the invention and various changes and modifications may be made without departing from the spirit and scope of the invention, as defined by the appended claims.

I claim:

1. A drive arrangement for driving a drive shaft supported for rotation within a housing assembly from an input shaft rotatable about an axis offset from the axis of said drive shaft, said arrangement comprising a driven gear having a hub portion, a thrust bearing affixed to said hub portion and having an inner race axially preloaded on said hub portion by first fastening means, a mounting plate surrounding said hub portion and axially retained between said driving gear and said thrust bearing and forming a subassembly therewith, and second fastening means for affixing said mounting plate to said housing assembly for preloading an outer race of said thrust bearing.

2. A drive arrangement as set forth in claim 1 wherein the thrust bearing is a double tapered thrust bearing for taking thrust in either of two driving directions.

3. A drive arrangement as set forth in claim 2 wherein the first fastening means comprises a nut threaded onto a threaded portion of the hub.

4. A drive arrangement as set forth in claim 3 wherein the second fastening means comprises bolts for affixing the mounting plate to the housing assembly.

5. A driven arrangement as set forth in claim 2 further including means for selectively driving the input shaft in either in a forward or reverse direction of rotation.

6. A drive arrangement as set forth in claim 1 in combination with a marine outboard drive including propulsion means carried by the housing assembly and driven by the drive shaft.

7. An outboard drive as set forth in claim 6 wherein the driven gear comprises a bevel gear and further including a driving bevel gear affixed for rotation with the input shaft and driving said driven bevel gear.

8. An outboard drive as set forth in claim 7 wherein the thrust bearing is a double tapered thrust bearing for taking thrust in either of two driving directions.

9. An outboard drive as set forth in claim 8 wherein the first fastening means comprises a nut threaded onto a threaded portion of the hub.

10. An outboard drive as set forth in claim 9 wherein the second fastening means comprises bolts for affixing the mounting plate to the housing assembly.

11. A driven arrangement as set forth in claim 8 wherein the input shaft has spaced apart splined portions and wherein the driving bevel gear is adapted to be affixed for rotation with either of said splined portions on opposite sides of the driven bevel gear for driving the driven bevel gear in selected directions of rotation depending upon which side of the driven bevel gear the driving bevel gear is affixed.

* * * * *